Oct. 19, 1948.　　　　　I. B. KEMPER　　　　　2,451,956
FOLDING VEHICLE FOR CHILDREN
Filed June 7, 1946　　　　　　　　　　　　　　　3 Sheets-Sheet 1
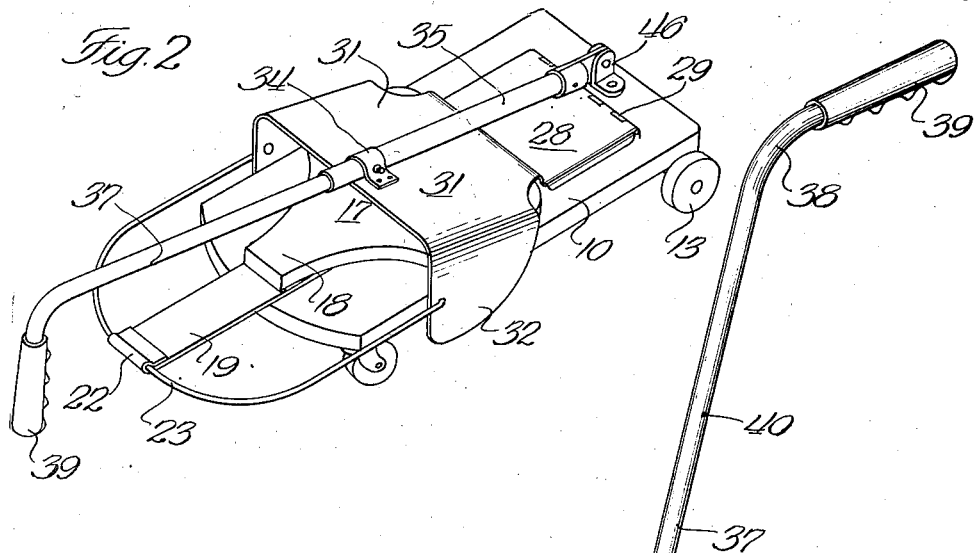
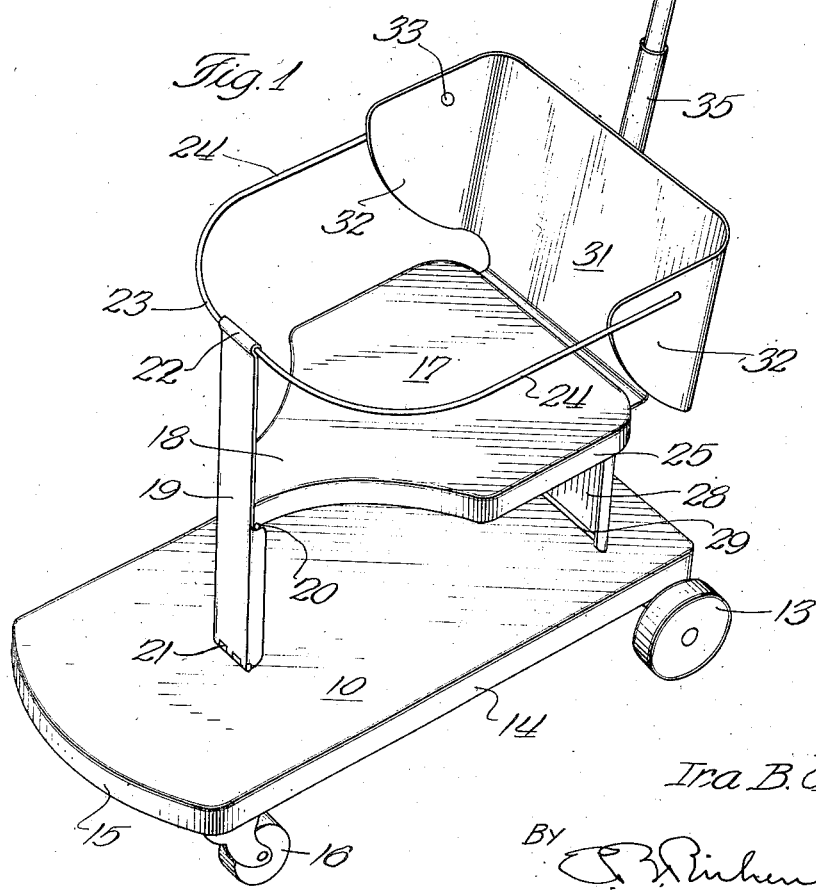
INVENTOR
Ira B. Kemper
BY
ATTORNEY Oct. 19, 1948.    I. B. KEMPER    2,451,956
FOLDING VEHICLE FOR CHILDREN
Filed June 7, 1946    3 Sheets-Sheet 2
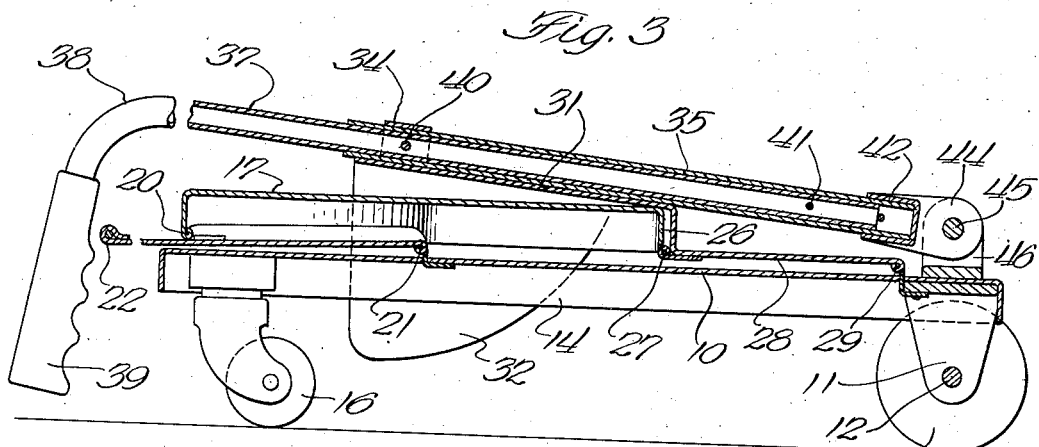
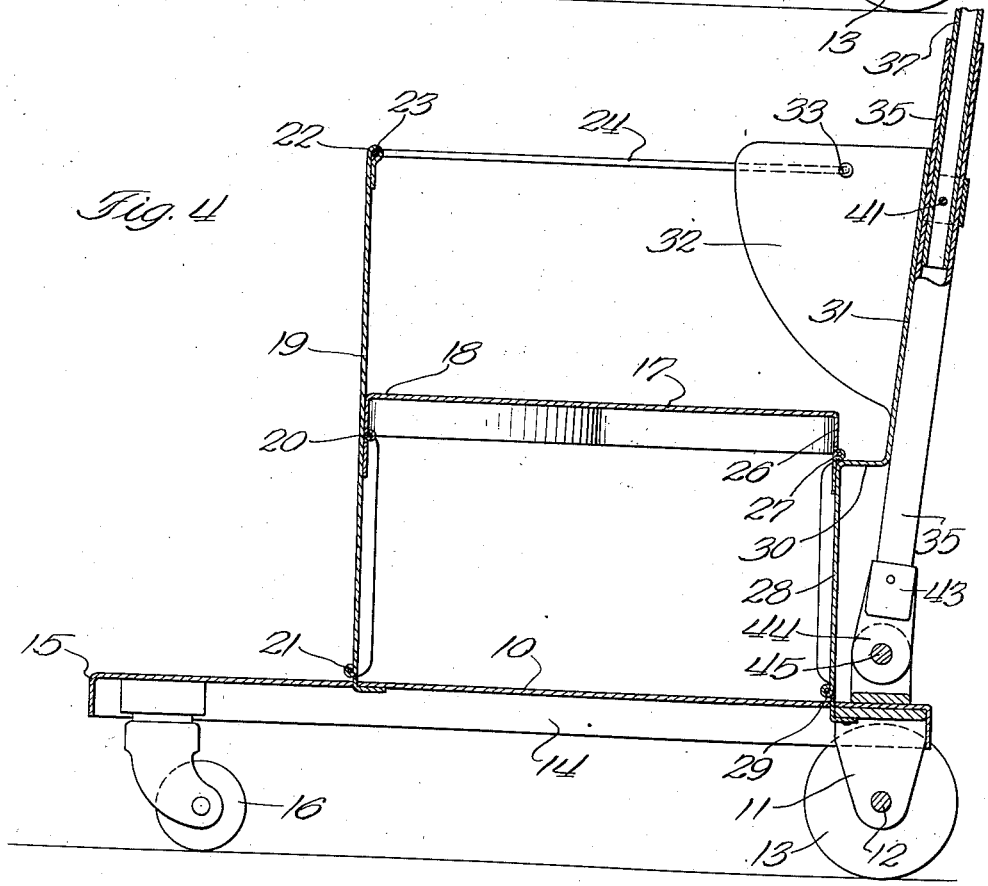
INVENTOR
Ira B. Kemper
BY
ATTORNEY

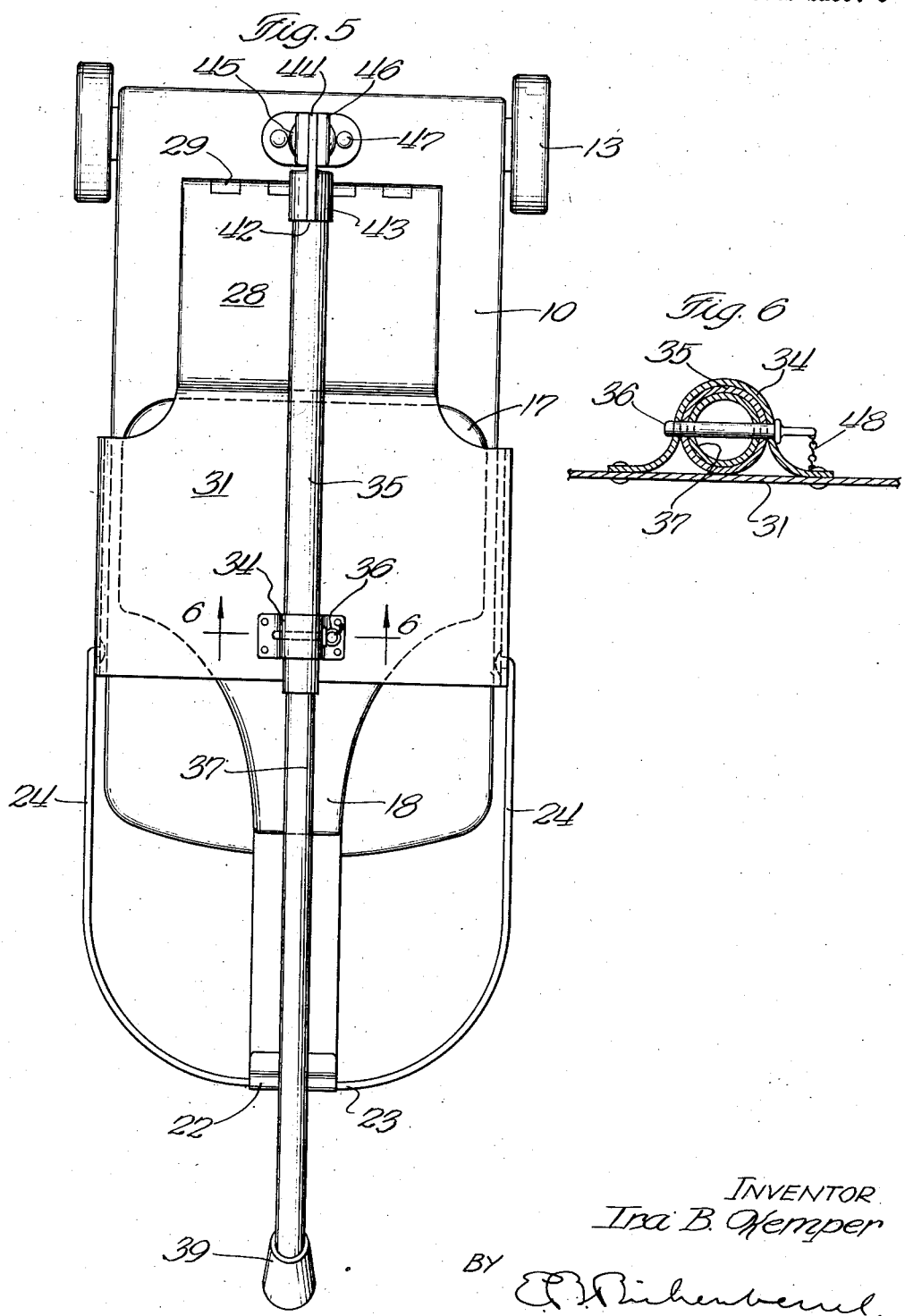

Patented Oct. 19, 1948

2,451,956

UNITED STATES PATENT OFFICE 2,451,956

FOLDING VEHICLE FOR CHILDREN

Ira B. Kemper, Portland, Oreg.

Application June 7, 1946, Serial No. 675,191

2 Claims. (Cl. 280—36)

This invention relates generally to vehicles, and particularly to a vehicle for children.

The main object of this invention is to provide a collapsible form of vehicle by means of which a child may be easily conveyed and which can be easily collapsed for storage or handling purposes when not in use.

The second object of this invention is to construct a vehicle of the class described, which will be rugged in construction and devoid of parts which can be easily rendered inoperative.

I accomplish these and other objects in a manner set forth in the following specification as illustrated in the accompanying drawings in which:

Figure 1 is a perspective view of the vehicle in position for use.

Figure 2 is a perspective view of the vehicle in a collapsed or folded position.

Figure 3 is a longitudinal section through the vehicle showing its construction and relation of the parts in a collapsed position.

Figure 4 is a longitudinal section showing the parts in a set up position.

Figure 5 is a plan of the vehicle as shown in Figures 2 and 3.

Figure 6 is a transverse section taken along the line 6—6 in Figure 5.

Similar numbers of reference refer to the same or similar parts throughout the several views.

Referring in detail to the drawing, there is shown a base 10 on the underside of the rear end of which is secured the standards 11 through which extends the axle 12 upon which are revolvably mounted the wheels 13. A downturned flange 14 extends about the perimeter of the base 10 and serves to reinforce same.

Under the forward ends 15 of the base 10 are the caster wheels 16.

Mounted over the base 10 is a seat 17, whose forward end 18 is narrowed and supported by the post 19 at the hinge point 20, while the lower end 21 is hinged directly to the base 10. The upper end 22 is beaded to receive the wire hand rail 23, whose sides 24 extend straight backwardly above and are parallel with the seat edges 25. The rear end 26 of the seat 17 is attached by means of a hinge 27 to the plate 28 whose lower edge is joined by the hinge 29 to the base 10.

The upper end 30 of the plate 28 is turned normal to the plate 28 and then extends upwardly to form a back 31 having the forwardly turned sides 32 which are pivotly connected to the sides 24 of the hand rail 23 at the points 33.

Secured to the back 31 is a strap 34 which passed around the tube 35 which is prevented from sliding therein, by means of a pin 36 which passes freely through the strap 34 and the tube 35 as well as through the handle 37 which is slidably within the tube 35. The handle 37 is provided with a curved end 38 upon which is mounted a hand grip 39. The handle 37 is provided with an opening 40 which is between the opening 41 and the hand grip 39, the purpose of which is to enable the handle 37 to be telescoped into the tube 35 as shown in Figure 3.

The lower end 42 of the tube 35 is provided with a socket 43 from which extends a shank 44 through which passes a rivet 45 which passes through the angle members 46 which in turn are secured to the base 10 by means of the rivets 47.

The operation of the device is as follows: Assuming that the parts are in the position shown in Figure 1, that is, with the pin 36 locking the members 31, 35 and 37 together, it follows that owing to the differences in the centers between the hinge 29 and the rivet 45 that the parts are held in the position shown in Figure 1 permitting the device to be propelled by means of the handle 37.

Now, if it is desired to collapse the device, it is only necessary to withdraw the pin 36 and fold the device to the position shown in Figure 3 and then turn the hand grip 39 downwardly and insert the pin 36 through the opening 40 thereby pinning the parts together in their collapsed relationship.

It can be seen from the foregoing that the vehicle above described is easy to operate and is compact in form and provides a desired transportation for a child.

It is desirable to provide the pin 36 with a chain 48 which is attached to the strap 34 in order to prevent the loss of the pin.

I claim:

1. A vehicle for children consisting of a base provided with ground engaging wheels, a post hingeably mounted on the forward end of said base, a seat disposed over said base, a plate hinged to said base and to the rear end of said seat, having an upwardly extending back formed thereon, the front of said seat being hinged to said post, a tube hinged to said base behind said plate hinge, a strap on said back adapted to slidably receive said tube, a tubular handle slidably and rotatively mounted in said tube said strap and tube having pin holes formed therethrough, and a pin occupying said holes when said post and plate are in upright positions.

2. The vehicle as described in claim 1, characterized by having a hand rail attached to the upper end of said post and extending around to the sides of said back.

IRA B. KEMPER.

REFERENCES CITED

The following references are of record in the file of this patent:

UNITED STATES PATENTS

| Number | Name | Date |
| --- | --- | --- |
| 1,434,535 | Fleury et al. | Nov. 7, 1922 |
| 1,928,807 | Barschow | Oct. 3, 1933 |
| 1,973,746 | Bukolt | Sept. 18, 1934 |
| 2,362,186 | Brantz | Nov. 7, 1944 |

FOREIGN PATENTS

| Number | Country | Date |
| --- | --- | --- |
| 558,399 | Great Britain | Jan. 4, 1944 |
| 618,223 | France | Dec. 10, 1926 |